Dec. 3, 1935. J. EGGERT ET AL 2,022,933
PHOTOGRAPHIC PRINTING
Filed April 7, 1934

Inventors:-
John Eggert,
Gerd Heymer,
By Potter, Pierce & Scheffler,
Attorneys.

Patented Dec. 3, 1935

2,022,933

UNITED STATES PATENT OFFICE 2,022,933

PHOTOGRAPHIC PRINTING

John Eggert, Leipzig-Gohlis, and Gerd Heymer, Wolfen, near Bitterfeld, Germany, assignors to I. G. Farbenindustrie Aktiengesellschaft, Frankfort-on-the-Main, Germany Application April 7, 1934, Serial No. 719,548
In Germany April 11, 1933

1 Claim. (Cl. 95—75)

Our present invention relates to photographic printing and more particularly to printing a lenticular film on to a lenticular film.

One of its objects is to provide an improved process for printing a lenticular film on to a lenticular film. Further objects will be seen from the detailed specification following hereafter.

Reference is made to the accompanying drawing in which.

In taking pictures on a lenticular film the multi-color filter used in this operation, is projected by the lenticular elements on the light-sensitive layer in such a manner that the images produced behind the marginal elements are displaced towards the margins of the film. When printing such a film on another lenticular film with the embossed sides facing each other the reproductions of the filter through the marginal elements of the print are displaced towards the margin of the picture field with respect to the middle axis of the lenticular elements.

In projecting a lenticular film, the filter must be arranged at the point of intersection of the rays passing through the centers of the reproductions of the filter behind each lenticular element and the centers of the co-ordinate lenticular elements. In the print produced by printing in contact from one lenticular film on to another one, the point of intersection of these connecting lines lies on the side of the light-sensitive layer. Such a film cannot be projected without the use of special compensating means.

According to this invention a lenticular print wherein the filter lines intersect before the lenticular screen is obtained by preparing an intermediate print from the lenticular original film, this film being placed in contact with another lenticular film in such a manner that the lenticular sides of the two films face each other. This intermediate print is used for the preparation of the final print by printing it on another lenticular film in contact, the two films being arranged with their embossings facing each other. In the print prepared by means of the intermediate print, the reproductions of the filter with respect to the middle of the lenticular elements are again displaced towards the margin so that the lines connecting the middle of the reproductions of the filter with the middle of the lenticular elements, in conformity with the original film, intersect before the embossed side of the film.

The relations existing in the process according to this invention are represented in the accompanying drawing.

Figure 1:
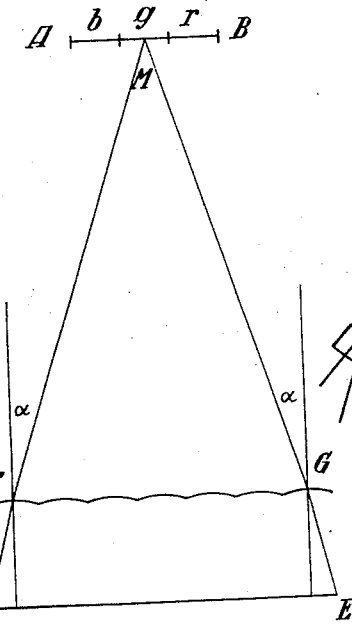
Fig. 1 shows the relations in taking a lenticular film.

Referring to Fig. 1, AB is the taking filter with the color strips red ($r$), green ($g$) and blue ($b$). The middle M of the filter is projected by the marginal lenticular elements F and G on the layer of the film to form images with the middles D and E which, as represented, are displaced towards the margin with respect to the middle line of the elements F and G.

Figure 2:
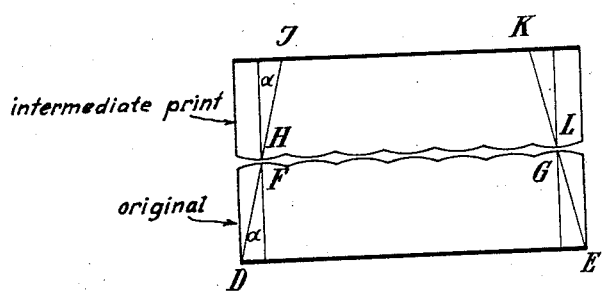
Fig. 2 shows the displacement of the filter reproductions on the intermediate print in comparison with the original film.

From Fig. 2 it will be seen that the marginal lines HI and KL corresponding with the marginal rays FD and GE of the original converge towards the middle of the film. By now printing a lenticular film in contact with the intermediate print a film is obtained, the marginal lines of which again show the position of the marginal lines DF and EG.

Figure 3:
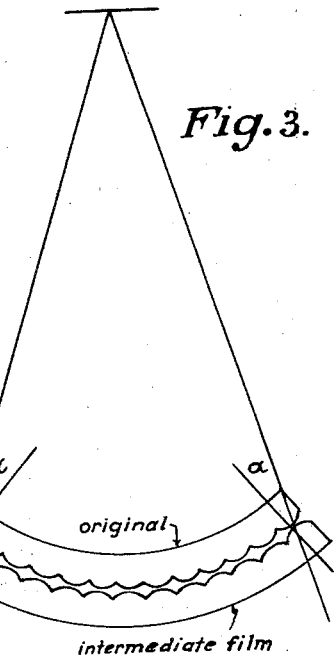
Fig. 3 shows printing of the original on the intermediate film.

In the printing process according to this invention the light rays of the printing light must have the same incidence on the film to be exposed, slight differences, however, being possible if they do not materially injure reproduction. In order that the light rays of the printing light have the same incidence on the printing film when printing the original on the intermediate film as in exposing the original the direction of the light rays has to proceed from the margin towards the middle of the film (see Fig. 2). In order to realize this, one may proceed as shown in Fig. 3. The original and the intermediate film are bent to a cylindrical plane until the green middle lines JD and KE forming with the main axis of the corresponding lenticular elements the angle $\alpha$ intersect in a point in front of the emulsion layer of the original. The source of light is then arranged in this point and has such an extension that it is seen from the middle of the films under the same angle as the multi-color filter in taking. This procedure is as described in our co-pending application Ser. No. 713,187, filed February 27, 1934.

Figure 4:
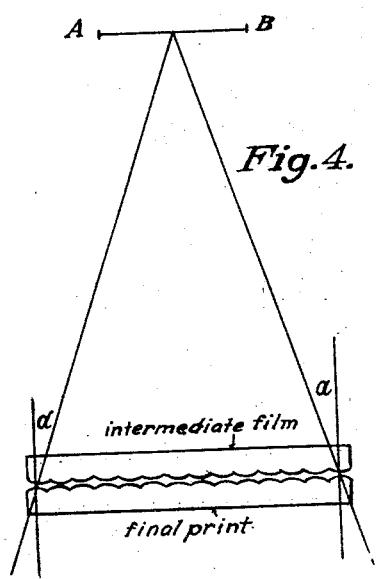
Fig. 4 shows the production of the final print from the intermediate film.

When printing the intermediate film on the final print the conditions for printing with regard to the main axis of the light can be realized very easily by exposing the plane lying films arranged in contact with their lenticular elements facing each other by means of a source of light AB shown in Fig. 4, said source of light having the same properties as that used in taking the original. There may also be used a distance of the source of light different from that of the taking filter, however, in this case the conditions must be observed as described in our above mentioned co-pending application.

Exposure in printing according to this invention must always be effected in such a manner that the main axis of corresponding lenticular elements of the original, the intermediate print and the final print forms with the green middle line of these elements the same angle. This may not only be effected according to the above co-pending application, but according to any other suitable method, for instance, according to our co-pending application Ser. No. 705,604, filed Jan. 6, 1934.

What we claim is:

A process of printing lenticular film on to lenticular film which comprises arranging a lenticular film bearing an original and a lenticular printing film in contact with the embossed sides facing each other, exposing the films by means of a source of light so that the angle of the light rays projected on the lenticular elements of the printing film with their main axis for each partial color picture is the same as the angle of the light rays projected on the corresponding lenticular elements in taking, arranging the intermediate print thus obtained in contact with a second printing film with the lenticular elements facing each other, and exposing the two films by means of a source of light so that the angle of the light rays projected on the lenticular elements of the printing film with their main axis for each partial color picture is the same as the angle of the light rays projected on the corresponding lenticular elements in printing the intermediate film and in taking.

JOHN EGGERT.
GERD HEYMER.